United States Patent
Satou (10) Patent No.: US 10,350,752 B2
(45) Date of Patent: Jul. 16, 2019

(54) ROBOT SYSTEM, MEASUREMENT DATA PROCESSING DEVICE AND MEASUREMENT DATA PROCESSING METHOD FOR PICKING OUT WORKPIECE USING MEASUREMENT DATA CORRECTED BY MEANS OF MACHINE LEARNING

(71) Applicant: FANUC CORPORATION, Yamanashi (JP)

(72) Inventor: Taiga Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/904,462

(22) Filed: Feb. 26, 2018

(65) Prior Publication Data

US 2018/0257225 A1 Sep. 13, 2018

(30) Foreign Application Priority Data

Mar. 13, 2017 (JP) .................................. 2017-047459

(51) Int. Cl.
*B25J 9/16* (2006.01)
*G06N 20/00* (2019.01)
(Continued)

(52) U.S. Cl.
CPC ............ *B25J 9/161* (2013.01); *B25J 9/1656* (2013.01); *B25J 9/1697* (2013.01); *G06F 15/76* (2013.01); *G06N 3/04* (2013.01); *G06N 20/00* (2019.01)

(58) Field of Classification Search
CPC ........ B25J 9/161; B25J 9/1697; B25J 9/1656; B25J 9/1669; G06N 20/00; G06N 3/04;
(Continued)

(56) References Cited

U.S. PATENT DOCUMENTS 4,613,269 A * 9/1986 Wilder .................... B25J 9/1697
348/92
7,966,094 B2 * 6/2011 Ban ........................ B25J 9/1697
700/213
(Continued)

FOREIGN PATENT DOCUMENTS

EP 1945416 BI 7/2008
JP H10-315174 12/1998
(Continued)

OTHER PUBLICATIONS

Henrik Saldner, "PalletPicker-3D, the solution for picking of randomly placed parts", 2003, Assembly Automation, vol. 23 Issue: 1, pp. 29-31, https://doi.org/10.1108/01445150310460042 (Year: 2003).*
(Continued)

*Primary Examiner* — Jamie Figueroa
(74) *Attorney, Agent, or Firm* — Hauptman Ham, LLP (57) ABSTRACT

A robot system includes a robot including a hand for holding a workpiece; a sensor for measuring a work area in which the workpiece exists to obtain a three-dimensional shape in the work area as measurement data; a measurement data processing device including a model data storage unit, a measurement data correction unit, a position and orientation calculation unit; and a robot control unit for control the robot based on an output from the position and orientation calculation unit, wherein the measurement data correction unit in a learning stage, creates teacher data by arranging the model data in the position and the orientation calculated by the position and orientation calculation unit and adjusts a parameter for correcting the measurement data based on the measurement data and the teacher data, and in a picking stage, outputs corrected measurement data obtained by correcting the measurement data using the adjusted parameter.

15 Claims, 8 Drawing Sheets

(51) Int. Cl.
*G06N 3/04* (2006.01)
*G06F 15/76* (2006.01)

(58) Field of Classification Search
CPC . G06F 15/76; G06T 7/75; G06T 2207/30164; G06K 9/3241; G06K 2209/19; G06K 9/4633; G06K 9/00214; G06K 9/6211; G05B 2219/40053
USPC ......................................................... 700/245
See application file for complete search history.

(56) References Cited

U.S. PATENT DOCUMENTS

| | | | | |
|---|---|---|---|---|
| 8,559,699 | B2* | 10/2013 | Boca | B25J 9/1679 382/153 |
| 8,948,904 | B2* | 2/2015 | Murayama | B25J 9/1612 318/568.21 |
| 9,026,234 | B2* | 5/2015 | Suzuki | B25J 9/1669 700/1 |
| 9,089,966 | B2* | 7/2015 | Domae | B25J 9/1612 |
| 9,089,971 | B2* | 7/2015 | Aoba | B25J 9/1697 |
| 9,102,053 | B2 | 8/2015 | Suzuki | |
| 9,132,548 | B2* | 9/2015 | Kamiya | B25J 9/1669 |
| 9,258,550 | B1* | 2/2016 | Sieracki | G01B 11/24 |
| 9,266,237 | B2* | 2/2016 | Nomura | B25J 9/1612 |
| 9,302,391 | B2* | 4/2016 | Iio | B25J 9/1679 |
| 9,486,921 | B1* | 11/2016 | Straszheim | B25J 9/1679 |
| 9,727,053 | B2* | 8/2017 | Ito | B25J 9/1697 |
| 2004/0186624 | A1* | 9/2004 | Oda | B25J 9/1697 700/245 |
| 2006/0104788 | A1* | 5/2006 | Ban | B25J 9/1697 414/729 |
| 2008/0253612 | A1* | 10/2008 | Reyier | B25J 9/1697 382/103 |
| 2010/0274391 | A1* | 10/2010 | Dai | B25J 9/1697 700/259 |
| 2011/0211938 | A1* | 9/2011 | Eakins | B25J 9/1687 414/738 |
| 2012/0215350 | A1* | 8/2012 | Murayama | B25J 9/1612 700/248 |
| 2012/0259462 | A1* | 10/2012 | Aoba | B25J 9/1697 700/245 |
| 2013/0006423 | A1* | 1/2013 | Ito | B25J 9/1612 700/259 |
| 2013/0054025 | A1 | 2/2013 | Ito | |
| 2013/0141570 | A1* | 6/2013 | Saruta | G06K 9/78 348/135 |
| 2013/0151007 | A1* | 6/2013 | Valpola | B25J 9/1694 700/245 |
| 2013/0211593 | A1* | 8/2013 | Domae | B25J 9/1612 700/258 |
| 2013/0238124 | A1* | 9/2013 | Suzuki | B25J 9/16 700/250 |
| 2013/0238128 | A1* | 9/2013 | Suzuki | B25J 9/1669 700/258 |
| 2014/0233807 | A1* | 8/2014 | Ejima | G06K 9/4633 382/106 |
| 2014/0277719 | A1* | 9/2014 | Kamiya | B25J 9/1669 700/253 |
| 2014/0365009 | A1* | 12/2014 | Wettels | B25J 9/1612 700/258 |
| 2015/0003678 | A1* | 1/2015 | Watanabe | B25J 9/1697 382/103 |
| 2015/0224650 | A1* | 8/2015 | Xu | B25J 15/0608 700/213 |
| 2015/0262012 | A1* | 9/2015 | Kim | G06K 9/3241 382/103 |
| 2015/0273688 | A1* | 10/2015 | Harada | B25J 9/1612 700/259 |
| 2016/0279809 | A1* | 9/2016 | Nakajima | B25J 9/1697 |
| 2016/0283792 | A1* | 9/2016 | Okazaki | G06K 9/00664 |
| 2017/0106540 | A1* | 4/2017 | Watanabe | B25J 9/1697 |
| 2017/0154430 | A1* | 6/2017 | Yoshii | G06T 7/70 |
| 2017/0177746 | A1* | 6/2017 | Gotou | G06F 17/50 |
| 2018/0050451 | A1* | 2/2018 | Takanishi | B25J 9/1633 |

FOREIGN PATENT DOCUMENTS

| | | |
|---|---|---|
| JP | 2008-309671 A | 12/2008 |
| JP | 2009128192 A | 6/2009 |
| JP | 2013010155 A | 1/2013 |
| JP | 2013-52490 A | 3/2013 |
| JP | 2014-137756 A | 7/2014 |
| JP | 2014-205209 A | 10/2014 |
| JP | 2016132086 A | 7/2016 |
| JP | 2017-30135 A | 2/2017 |

OTHER PUBLICATIONS

Y. Yanagihara et al, Parts-picking in Disordered Environment, Nov. 1991, Proceedings IROS '91: IEEE / RSJ International Workshop on Intelligent Robots and Systems '91, pp. 1-6 (Year: 1991).*

Rolf Dieter Schraft, Thomas Ledermann, Intelligent picking of chaotically stored objects, 2003, Assembly Automation vol. 23 • No. 1 • 2003 • pp. 38-42, https://doi.org/10.1108/01445150310460079 (Year: 2003).*

Chao Dong et al., "Image Super-Resolution Using Deep Convolutional Networks", IEEE Transactions on Pattern Analysis and Machine Intelligence. Jul. 31, 2015; 14pp.

* cited by examiner

ROBOT SYSTEM, MEASUREMENT DATA PROCESSING DEVICE AND MEASUREMENT DATA PROCESSING METHOD FOR PICKING OUT WORKPIECE USING MEASUREMENT DATA CORRECTED BY MEANS OF MACHINE LEARNING

RELATED APPLICATIONS

The present application claims priority to Japanese Patent Application Number 2017-047459, filed Mar. 13, 2017, the disclosure of which is hereby incorporated by reference herein in its entirety.

BACKGROUND OF THE INVENTION

1. Field of the Invention

The present invention relates to a robot system, a measurement data processing device and a measurement data processing method for picking out a workpiece using measurement data corrected by means of machine learning.

2. Description of the Related Art

In the past, there have been known systems for picking out an article randomly loaded in a container such as a container (a workpiece randomly loaded in a three-dimensional space) with a robot (a system or a robot system for picking out an article randomly loaded). In such a system for picking out an article randomly loaded, a workpiece may be picked out by a robot, for example, by obtaining data of a three-dimensional shape inside a container by measuring with a sensor to identify a position and an orientation of the workpiece from the data of the three-dimensional shape inside the container.

With regard to picking out an article randomly loaded by a robot system, for example, during an operation of moving a hand of a robot closer to a workpiece to pick out the workpiece, the hand may collide with a container or other workpieces. To prevent such a collision from occurring, there has been a practice to utilize the data of the three-dimensional shape measured by the sensor.

In the past, for example, Japanese Laid-Open Patent Publication No. 2016-132086 discloses a technique of calculating a position and an orientation of a workpiece by collating measurement data with accumulated data. In addition, Japanese Laid-Open Patent Publication No. 2009-128192 discloses a technique of calculating a position and an orientation of an object with high degree of precision by repeating correction based on a model (model data). Furthermore, Japanese Laid-Open Patent Publication No. 2013-010155 discloses a technique of generating collation data by employing machine learning. Chao Dong et al., "Image Super-Resolution Using Deep Convolutional Networks," IEEE Transactions on Pattern Analysis and Machine Intelligence (https://arxiv.org/abs/1501.00092), Jul. 31, 2015 also discloses a technique of correcting obtained data using deep learning.

As described above, when a position and an orientation of a workpiece is calculated by collating measurement data with accumulated data, collation may not be performed with precision, for example, when there is an error in measurement data. When gripping a workpiece, measurement data is used for determining whether there is a collision between a surrounding structure (such as a container) and a gripping mechanism (such as a hand), but when there is an error in measurement data, it becomes difficult to make determination on a collision.

In addition, when calculating a position and an orientation of an object by repeating corrections based on a model, it is difficult to reduce the rate corresponding to the error in the measurement data itself. Furthermore, conventional machine learning has been employed for generating collation data.

Thus, in conventional robot systems and measurement data processing techniques, there has been a problem in that when picking out a workpiece randomly loaded, a hand of a robot may collide with a container or other workpieces. In addition, there is also a problem in that operation efficiency decreases because a picking operation for a workpiece that may be picked out under normal conditions is determined to be impossible and not performed to avoid occurrence of such a collision.

It is an object of the present embodiment, in view of the aforementioned problems of conventional techniques, to provide a robot system, a measurement data processing device, and a measurement data processing method that may improve accuracy in picking out a workpiece by correcting measurement data itself.

SUMMARY OF INVENTION

According to a first aspect of the present invention, there is provided a robot system including a robot including a hand configured to hold a workpiece; a sensor configured to measure a work area in which the workpiece exists to obtain a three-dimensional shape in the work area as measurement data; a measurement data processing device including a model data storage unit configured to store a three-dimensional shape of the workpiece as model data, a measurement data correction unit configured to correct the measurement data by means of machine learning, a position and orientation calculation unit configured to collate the measurement data with the model data to calculate a position and an orientation of the workpiece in the work area; and a robot control unit configured to control the robot based on an output from the position and orientation calculation unit, wherein the measurement data correction unit in a learning stage, creates teacher data by arranging the model data in the position and the orientation calculated by the position and orientation calculation unit and adjusts a parameter for correcting the measurement data based on the measurement data and the teacher data, and in a picking stage, outputs corrected measurement data obtained by correcting the measurement data using the adjusted parameter.

According to a second aspect of the present invention, there is provided a measurement data processing device including a model data storage unit configured to store a three-dimensional shape of a workpiece as model data; a measurement data correction unit configured to correct measurement data obtained by measuring a three-dimensional shape in a work area in which the workpiece exists by means of machine learning; and a position and orientation calculation unit configured to collate the measurement data with the model data to calculate a position and an orientation of the workpiece in the work area, wherein the measurement data correction unit in a learning stage, creates teacher data by arranging the model data in the position and the orientation calculated by the position and orientation calculation unit and adjusts a parameter for correcting the measurement data based on the measurement data and the teacher data, and in a picking stage, outputs corrected measurement data obtained by correcting the measurement data using the adjusted parameter.

According to a third aspect of the present invention, there is provided a measurement data processing method including storing a three-dimensional shape of a workpiece as model data; correcting measurement data obtained by measuring a three-dimensional shape in a work area in which the workpiece exists by means of machine learning; and collating the measurement data with the model data to calculate a position and an orientation of the workpiece in the work area, wherein in a learning stage, teacher data is created by arranging the model data in the calculated position and orientation of the workpiece in the work area and a parameter for correcting the measurement data is adjusted based on the measurement data and the teacher data, and in a picking stage, corrected measurement data obtained by correcting the measurement data using the adjusted parameter are output.

BRIEF DESCRIPTION OF THE DRAWINGS

The present invention will be understood more clearly by referring to the following accompanying drawings.

DETAILED DESCRIPTION

Figure 1:
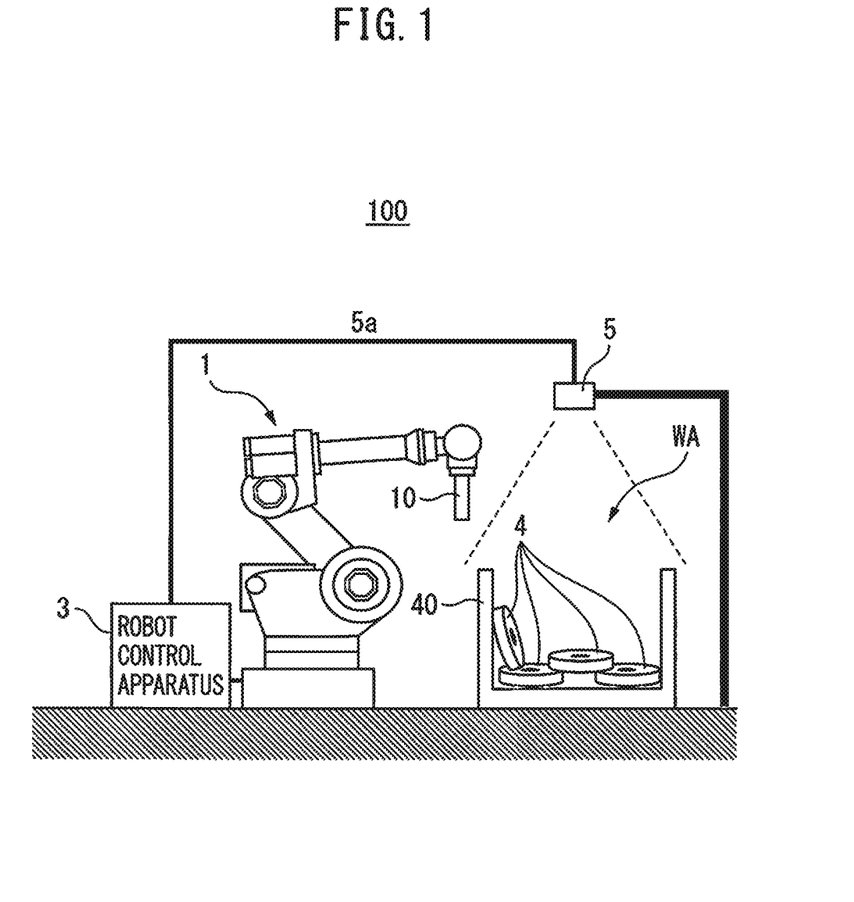
FIG. 1 is a diagram schematically illustrating an example of a robot system.

First, before describing an embodiment of a robot system, a measurement data processing device, and a measurement data processing method in detail, an example of the robot system and a problem in measurement data processing of the robot system are described with reference to FIG. 1 to FIG. 3C. FIG. 1 is a diagram schematically illustrating an example of the robot system.

As illustrated in FIG. 1, a robot system 100 picks out a plurality of workpieces (components) 4 randomly loaded in a bin such as a container 40 sequentially, and includes a robot 1, a sensor 5, and a robot control apparatus 3. Needless to say, the workpieces 4 are not limited to items stored in the container 40, and may be, for example, items randomly loaded in a three-dimensional space.

On a lateral side of the robot 1, the box-shaped container 40 with an open upper face is disposed. The container 40 has its upper face open, and accommodates a plurality of workpieces randomly loaded (a plurality of workpieces placed in a random fashion including a randomly loaded state) 4 in its accommodating space. It is to be noted that the workpieces 4 may be held by a hand 10 mounted on the robot 1, and may be picked out one by one from the container 40 with an operation of the robot 1 and the hand 10 controlled by the robot control apparatus 3. In addition, the sensor 5 is installed above a center of the container 40, and an output (measurement data) 5a from the sensor 5 is input into the robot control apparatus 3.

In FIG. 1, to simplify description, an example is illustrated in a state in which four discoid-shaped workpieces 4 are randomly loaded in the container 40 with a central hole of each workpiece 4 held by the hand (inner-diameter chuck) 10; however, the shape of the workpiece 4 is not limited to a discoid shape and a holding mechanism for the workpiece 4 is not limited to an inner-diameter chuck. In other words, the hand 10 may have a variety of forms that may hold the workpiece 4 and, for example, may have a form that grips the workpiece 4 by opening/closing two or more claw portions, or may include an electromagnet or a negative-pressure generating device that generates a suction force against the workpiece 4.

Furthermore, the sensor 5 is a variety of sensors including a visual sensor as long as it may obtain data of a three-dimensional shape in the measurement area. For measurement of a three-dimensional shape, a method such as a stereo method using two cameras, a scanning method using laser slit light, a scanning method using a laser beam spot, a method of projecting light patterns on the workpiece using a device such as a light projector, or a method of using time from when light is emitted from a light projector to when the light reflected on a surface of a workpiece 4 enters a light receiver may be employed, and various methods such as the triangulation method, the light section method, the time-of-flight method, the Depth from Defocus method, or a combination thereof may be employed.

It is to be noted that although, in FIG. 1, the output (measurement data) 5a from the sensor 5 is input into the robot control apparatus 3 and the robot control apparatus 3 performs measurement data processing and the like, the output 5a from the sensor 5 may be configured to be processed by a dedicated measurement data processing device or the like provided separately from the robot control apparatus 3 and an output from the measurement data processing device may be input into the robot control apparatus 3. Furthermore, although the sensor 5 is provided fixed above the center of the container 40, the sensor 5 may be provided as a hand eye attached to a tip (tip portion) of the hand of the robot 1.

Thus, in the robot system 100 illustrated in FIG. 1, the robot control apparatus 3 is configured to calculate, on the basis of three-dimensional positions and orientations of a plurality of workpieces 4 randomly loaded and the output 5a from the sensor 5 configured to measure a three-dimensional shape and the like of the container 40, holding position and orientation data consisting of a position and an orientation for holding the workpieces 4 with the inner-diameter chuck 10 of the robot 1, and to pick out the workpieces 4 one by one by controlling the robot 1 and the inner-diameter chuck 10.

Figure 2A:
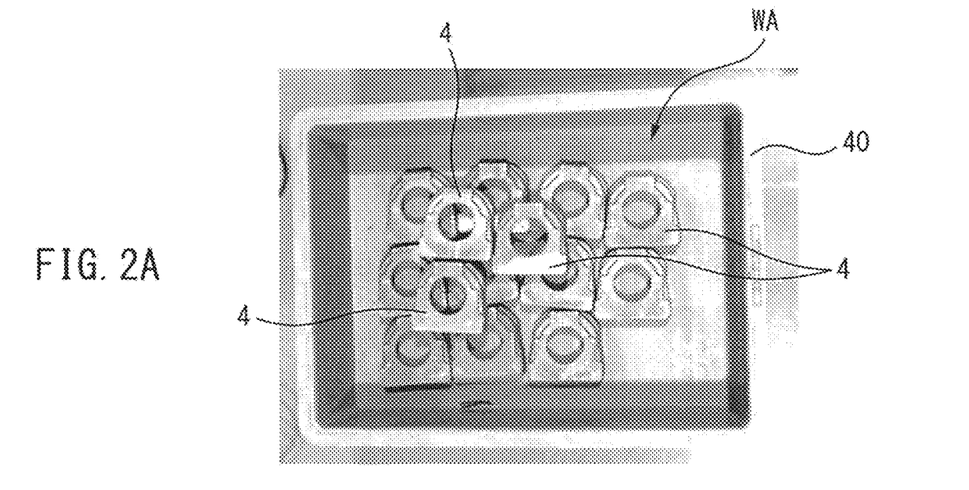
FIG. 2A, FIG. 2B, and FIG. 2C are figures for explaining an example of a problem in measurement data by the robot system.
Figure 2B:
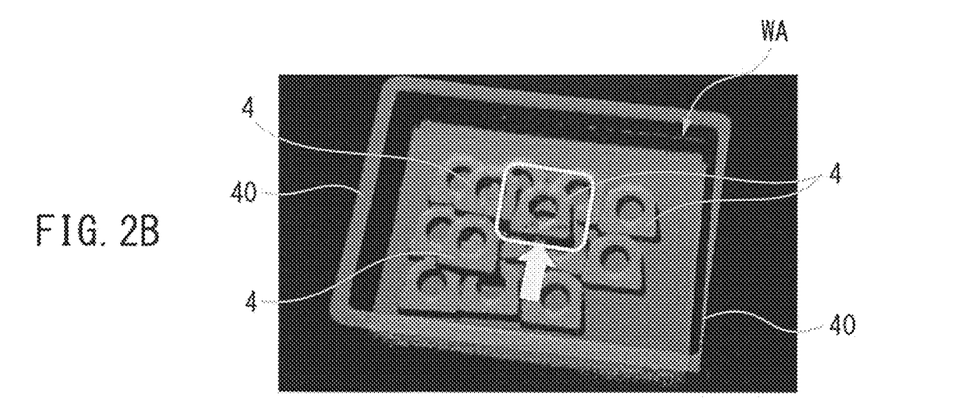
Figure 2C:
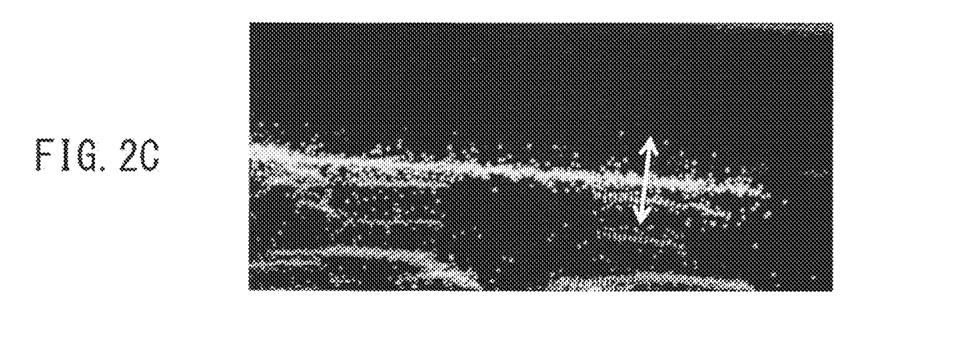
Figure 3A:
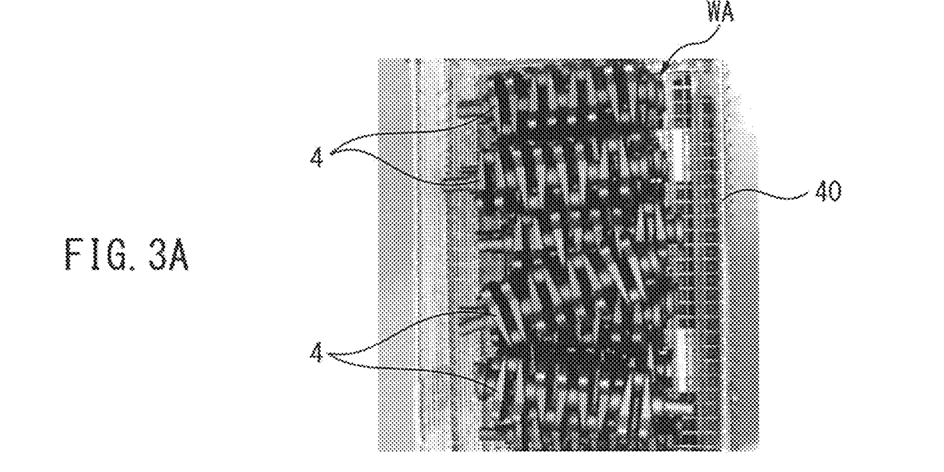
FIG. 3A, FIG. 3B, and FIG. 3C are figures for explaining another example of the problem in measurement data by the robot system.
Figure 3B:
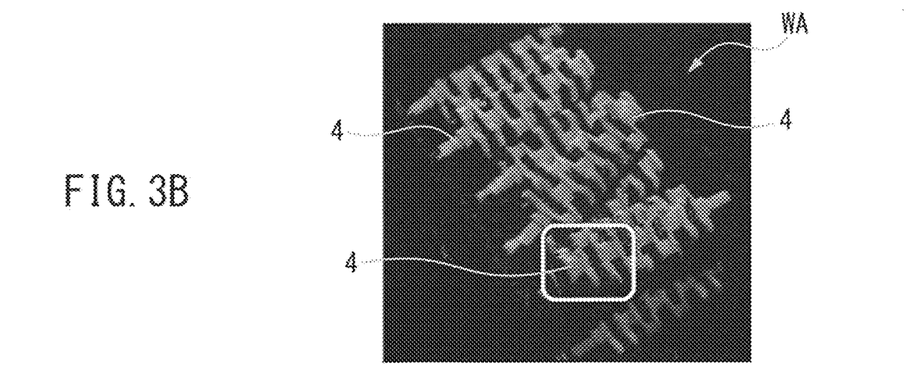
Figure 3C:
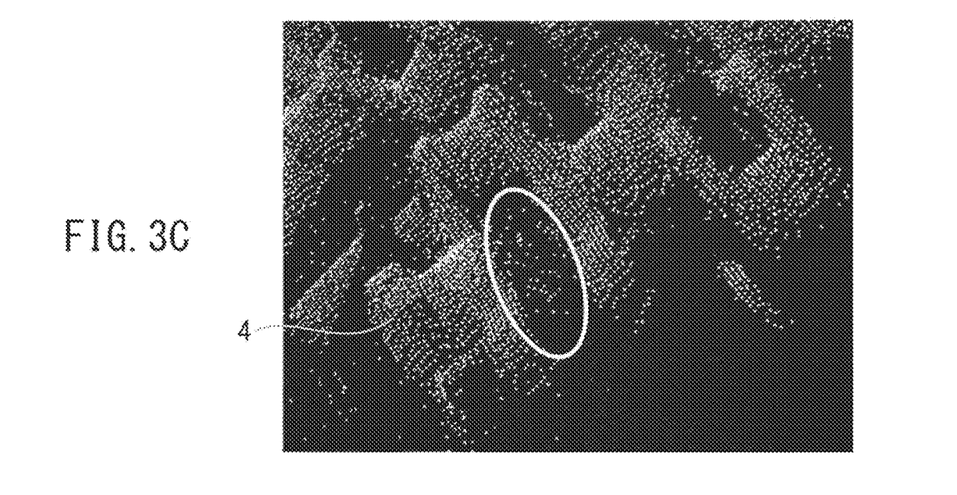

FIG. 2A to FIG. 2C are figures for explaining an example of a problem in measurement data processing by the robot system, and FIG. 3A to FIG. 3C are figures for explaining another example of a problem in measurement data processing by the robot system. FIG. 2A and FIG. 3A illustrate images of measurement area (work area) WA while FIG. 2B and FIG. 3B illustrate examples of the measurement data 5*a* of the work area WA by the sensor 5. FIG. 2C is a figure illustrating a state in which the measurement data 5*a* in FIG. 2B is observed from the direction of an arrow while FIG. 3C is a figure illustrating a portion of the measurement data 5*a* in FIG. 3B enlarged.

For example, a state in which a plurality of workpieces 4 are randomly loaded in the work area WA (in the container 40) as illustrated in FIG. 2B is obtained as the measurement data 5*a* by the sensor 5 as illustrated in FIG. 2B. In this case, in the measurement data 5*a* as illustrated in FIG. 2C, for example, measurement points at a flat surface of the workpiece 4 are measured to include an error (thickness), which makes a rate of the measurement data 5*a* matching CAD (Computer-Aided Design) data decrease, and a workpiece is not detected due to a reason such as the rate falling below a threshold for matching allowed for a detection result, or picking out the workpiece 4 becomes difficult.

Furthermore, for example, a state in which a plurality of workpieces 4 are randomly loaded in the work area WA as illustrated in FIG. 3A is obtained as the measurement data 5*a* by the sensor 5 as illustrated in FIG. 3B. In this case, it may be observed that a border is blurred around an edge of the workpiece 4 in the measurement data 5*a* as illustrated in FIG. 3C. When it is determined, for example, that the hand 10 of the robot 1 will collide with a measurement point at the border that has been determined to be blurred when picking out the workpiece 4, there is a possibility that the workpiece 4 that may be picked out under normal conditions may be processed as an item incapable to be picked out, thereby reducing the production efficiency or the like.

Figure 4:
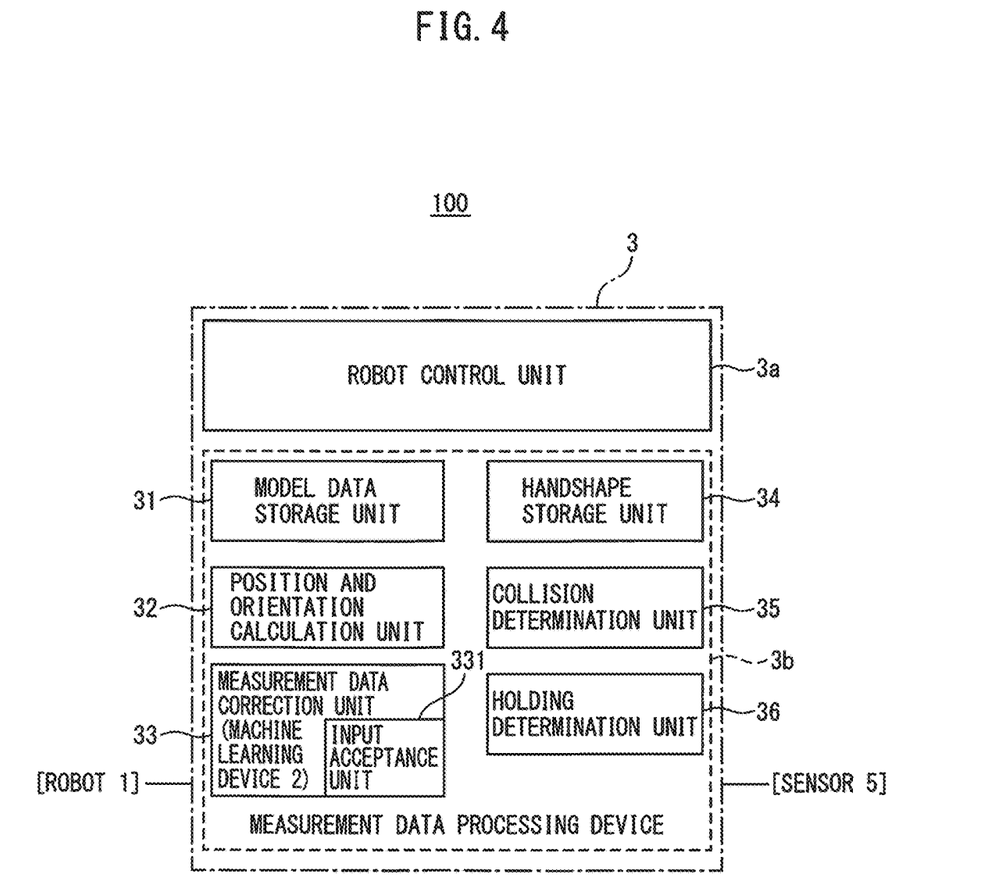
FIG. 4 is a functional block diagram illustrating an example of a robot control apparatus in a robot system according to the present embodiment.

A robot system, a measurement data processing device, and a measurement data processing method according to the present embodiment will be described below in detail with reference to the accompanying drawings. FIG. 4 is a functional block diagram illustrating an example of a robot control apparatus in the robot system according to the present embodiment. Although the robot system according to the present embodiment corresponds to the robot system described with reference to FIG. 1, in a robot control apparatus 3, for example, a measurement data processing device 3*b* that achieves various functions to be described in the following are built in together with a robot control unit 3*a* that controls operations of the robot 1. As described with reference to FIG. 1, it goes without saying that the hand (10) of the robot 1 may have a variety of forms as long as the hand 10 may hold the workpiece, and the sensor 5 may be any sensor based on various methods.

Needless to say, the measurement data processing device 3*b* is not limited to a device built into the robot control apparatus 3, and the measurement data processing device 3*b* may be, for example, provided separately or in other control devices or the like. In addition, respective functional blocks included in the measurement data processing device 3*b* as illustrated in FIG. 4 may be implemented by software on a computer including MPU (Micro-processing unit), ROM (Read Only Memory), RAM (Random access memory) and the like. A measurement data correction unit 33 corresponds to a machine learning device 2 that performs machine learning (supervised learning).

In other words, a robot system 100 according to the present embodiment includes, similarly to the one described with reference to FIG. 1, the robot 1 with the hand (10) that may hold the workpiece (4), the sensor 5 that measures a work area in which the workpiece exists to obtain a three-dimensional shape in the work area (WA) as measurement data (5*a*), and the robot control apparatus 3. Needless to say, a variety of devices such as a teach pendant that gives teachings to the robot 1 or a display device may be connected to the robot control apparatus 3.

As illustrated in FIG. 4, the robot control apparatus 3 includes, for example, the robot control unit 3*a* and the measurement data processing device 3*b* while the measurement data processing device 3*b* includes a model data storage unit 31, a position and orientation calculation unit 32, a measurement data correction unit 33, a handshape storage unit 34, a collision determination unit 35, and a holding determination unit 36. The model data storage unit 31 stores a three-dimensional shape of a workpiece as model data while the position and orientation calculation unit 32 collates measurement data with the model data to calculate a position and an orientation of the workpiece in the work area. The collision determination unit 35 and the measurement data correction unit 33 may be, for example, provided as an external device rather than provided in the robot control apparatus 3.

The measurement data correction unit 33 corrects, for example, measurement data by means of machine learning (supervised learning). In other words, the measurement data correction unit 33, for example, in a learning stage in which learning is performed, creates teacher data by arranging the model data in the position and the orientation calculated by the position and orientation calculation unit 32 and adjusts a parameter for correcting the measurement data on the basis of the measurement data and the teacher data. Furthermore, for example, in a picking stage in which the workpiece is actually picked out, the measurement data correction unit 33 outputs corrected measurement data obtained by correcting the measurement data using the adjusted parameter. It is to be noted that the robot control unit 3*a* controls the robot 1 on the basis of an output from the measurement data correction unit 33.

The handshape storage unit 34 stores shape data of the hand (10) while the collision determination unit 35 determines whether a collision will occur at the position and the orientation for holding the workpiece on the basis of the shape data of the hand and the corrected measurement data. The measurement data correction unit 33 may include an input acceptance unit 331 configured to input whether to use an output result from the position and orientation calculation unit 32 as teacher data or not. In the learning stage, a parameter for correcting the measurement data is adjusted using the teacher data given by the input acceptance unit 331. The holding determination unit 36 determines whether holding the workpiece has resulted in success or failure. In the learning stage, an area of the workpiece for which holding has resulted in success may also be input into the measurement data correction unit 33 as the teacher data to adjust the parameter for correcting the measurement data.

In the aforementioned description, the workpiece (4) may be, for example, a plurality of workpieces randomly loaded in the work area (WA) as illustrated in FIG. 1. In addition, the sensor 5 may be a visual sensor fixed at a position from which the work area may be captured or mounted on a tip of the robot 1. Thus, the robot system 100 of the present embodiment may improve accuracy in picking out the workpiece by correcting the measurement data itself.

Figure 5:
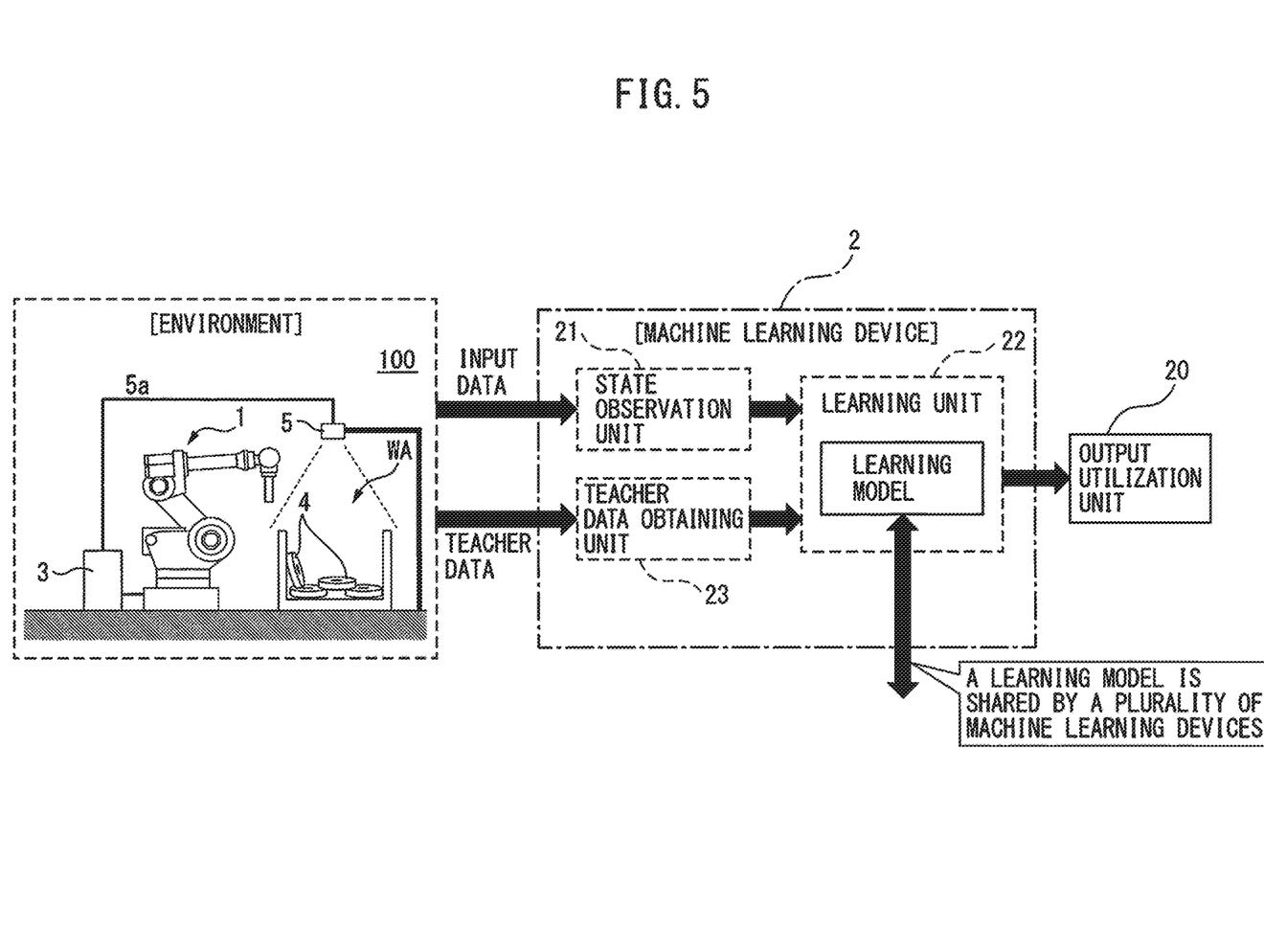
FIG. 5 is a diagram schematically illustrating an example of a machine learning device provided in a measurement data processing device according to the present embodiment.

FIG. 5 is a diagram schematically illustrating an example of a machine learning device provided in the measurement data processing device according to the present embodiment. As illustrated in FIG. 5, the machine learning device 2 corresponds to the measurement data correction unit 33 in the measurement data processing device 3*b*, for example, in the learning stage, that creates teacher data by arranging the model data in the position and the orientation calculated by the position and orientation calculation unit 32 and adjusts a parameter for correcting the measurement data on the basis of the measurement data and the teacher data. It is to be noted, as described above, that the measurement data processing device 3b (machine learning device 2) may be built into the robot control apparatus 3 in which the robot control unit 3a is provided, but may be, for example, provided separately from the robot control apparatus 3.

The machine learning device 2 performs supervised learning and includes a state observation unit 21, a learning unit 22, and a teacher data obtaining unit 23. In supervised learning, a large number of teacher data, i.e., sets of certain inputs and corresponding results (teacher data) are fed into the machine learning device 2 to learn features seen in those data sets, and a parameter for correcting measurement data is adjusted.

The state observation unit 21 observes, for example, data based on measurement data 5a from the sensor 5 as a state variable while the teacher data obtaining unit 23 obtains the data based on the measurement data 5a as teacher data (data obtained by arranging the model data in the position and the orientation output by the position and orientation calculation unit 32) for the workpiece 4. The learning unit 22 creates a learning model for adjusting the parameter for correcting the measurement data 5a on the basis of an output (state variable) from the state observation unit 21 and an output (teacher data) from the teacher data obtaining unit 23. As the teacher data, for example, CAD data of the workpiece 4 based on the position and the orientation of the workpiece 4 in the work area WA may be used.

The output utilization unit 20 utilizes an output from the machine learning device 2 and corresponds to, for example, the aforementioned collision determination unit 35 in FIG. 4, and the output utilization unit 20 may be provided as an external device together with the measurement data correction unit 33 corresponding to the machine learning device 2 as described above.

The learning model obtained by the machine learning device 2 may be utilized by at least one other machine learning device 2. In other words, the measurement data correction unit 33 may be capable of connecting (communicating) with a measurement data correction unit (another measurement data correction unit) in at least one other measurement data processing device, and may mutually exchange or share the parameter adjusted by the measurement data correction unit 33 with the measurement data correction unit in the at least one other measurement data processing device. Furthermore, the machine learning device 2 (measurement data correction unit 33) need not be provided in the robot control apparatus 3 (edge) that controls its corresponding robot 1, and may be provided, for example, for each factory having a plurality of robots 1 (robot system 100) (for example, on a fog server) or on a cloud server connected to a plurality of factories via a connection line such as the Internet. It is to be noted that the machine learning device 2 may be configured, for example, using a multi-layer neural network. Although a general-purpose computer or processor may be used for the machine learning device 2, use of e.g., GPGPU (General-Purpose computing on Graphics Processing Units) or large-scale PC clusters allows higher-speed processing.

Figure 6:
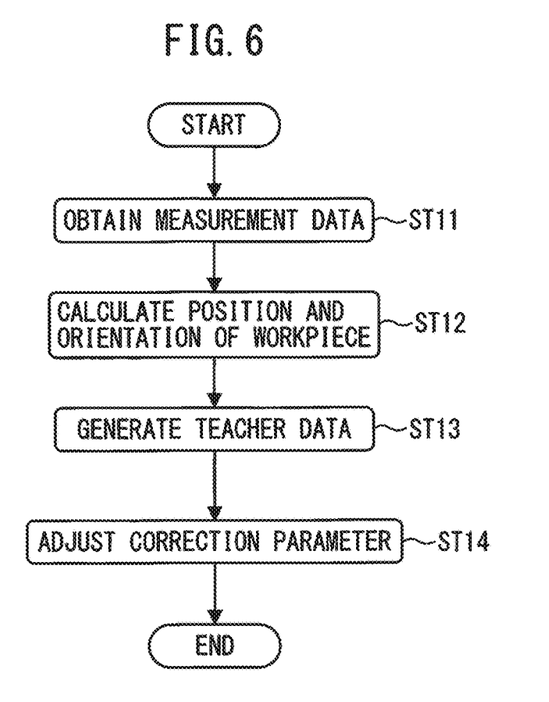
FIG. 6 is a flowchart for explaining an exemplary process in a learning stage.

FIG. 6 is a flowchart for explaining an exemplary process in the learning stage. As illustrated in FIG. 6, when the exemplary process in the learning stage is started, measurement data (5a), for example, from the sensor (visual sensor) 5 is obtained in step ST11 and the process proceeds to step ST12. The measurement data obtained in step ST11 may be data obtained as a result of a single measurement, but may be, for example, a plurality of data obtained as a result of measuring a plurality of times with respect to a loading state of a plurality of workpieces.

In step ST12, the position and the orientation of the workpiece are calculated (the position and orientation calculation is performed), and the process proceeds to step ST13. It is to be noted that although the position and orientation calculation performed in step ST12 may be performed once with respect to a single measurement data, it may be performed a plurality of times with respect to a plurality of measurement data. In step ST13, teacher data is generated, the process then proceeds to step ST14 to adjust a correction parameter, and the process is completed.

In other words, in step ST13, teacher data for performing supervised learning is created by the machine learning device 2, which teacher data is created for example, on the basis of the position and the orientation of the workpiece and the model data of the workpiece (for example, CAD data of the workpiece). In addition, adjustment of the correction parameter in step ST14 corresponds to, for example, the aforementioned process by the measurement data correction unit 33 in FIG. 4, or the supervised learning process by the machine learning device 2 in FIG. 5. The process in step ST14 is performed by using, for example, only an area for which the teacher data exists; in other words, the model data is virtually arranged in the position and the orientation calculated in step ST12 and learning is performed only for an area for which the arranged model data exists.

Figure 7:
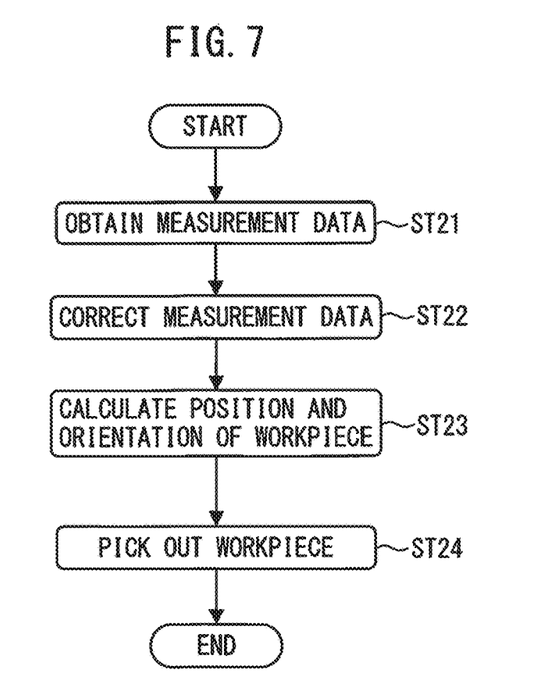
FIG. 7 is a flowchart for explaining an exemplary process in a picking stage.

FIG. 7 is a flowchart for explaining an exemplary process in the picking stage. As illustrated in FIG. 7, when the exemplary process in the picking stage is started, measurement data is obtained in step ST21, the process proceeds to step ST22, and correction of the measurement data, i.e., correction of the measurement data using the parameter (correction parameter) adjusted in the learning stage in the aforementioned step ST14 is performed.

The process proceeds further to step ST23 to calculate the position and the orientation of the workpiece. In other words, in step ST23, the position and the orientation of the workpiece are calculated using the corrected measurement data. The process proceeds further to step ST24 and the workpiece is picked out. In other words, in step ST24, the robot control apparatus 3 (robot control unit 3a) controls the robot (1) and the hand (10) to hold the workpiece for which the position and the orientation have been calculated in step ST23. Thus, the position and the orientation of the workpiece (4) become specific, and detection of the workpiece is stabilized, thereby improving the success rate of picking out the workpiece.

Figure 8:
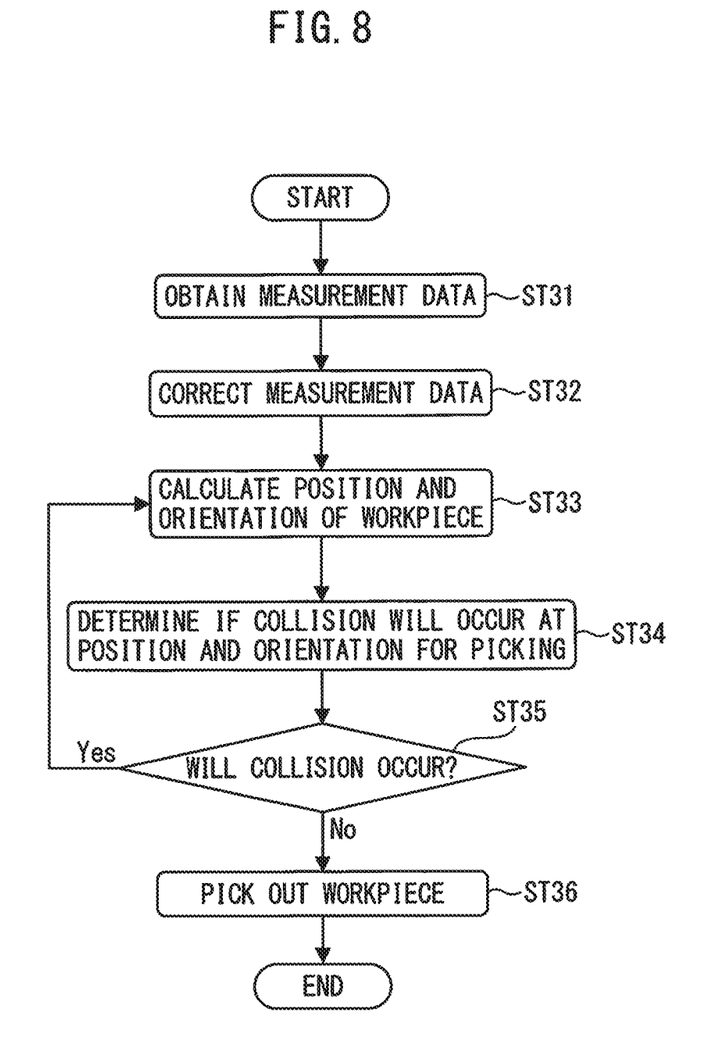
FIG. 8 is a flowchart for explaining another exemplary process in the picking stage.

FIG. 8 is a flowchart for explaining another exemplary process in the picking stage. As illustrated in FIG. 8, when the another exemplary process in the picking stage is started, measurement data is obtained in step ST31, and the process proceeds to step ST32 to correct the measurement data. The process proceeds further to step ST33 to calculate the position and the orientation of the workpiece. It is to be noted that the processes in steps ST31 to ST33 in FIG. 8 are the same as those in steps ST21 to ST23 in FIG. 7.

Next, the process proceeds to step ST34 to determine whether a collision will occur at the position and the orientation at which picking is to be performed, and the process proceeds to step ST35. In step ST35, on the basis of the corrected measurement data and the shape data of the hand, it is determined whether a collision will occur at the position and the orientation for holding the workpiece for which the position and the orientation are calculated. When it is determined that a collision will occur at the position and the orientation for holding the workpiece in step ST35, the process returns to step ST33 and obtains, for example, a position and an orientation of another workpiece, and performs the same process.

On the other hand, when it is determined that a collision will not occur at the position and the orientation for holding the workpiece in step ST35, the process proceeds to step ST36 to pick out the workpiece, and the process is completed. Thus, it is possible to correctly determine whether a collision will occur during an operation of picking out the workpiece, thereby reducing unpicked workpieces and reducing collision of the hand with the container or other workpieces or the like during the operation of picking out the workpiece due to an erroneous measurement.

Figure 9:
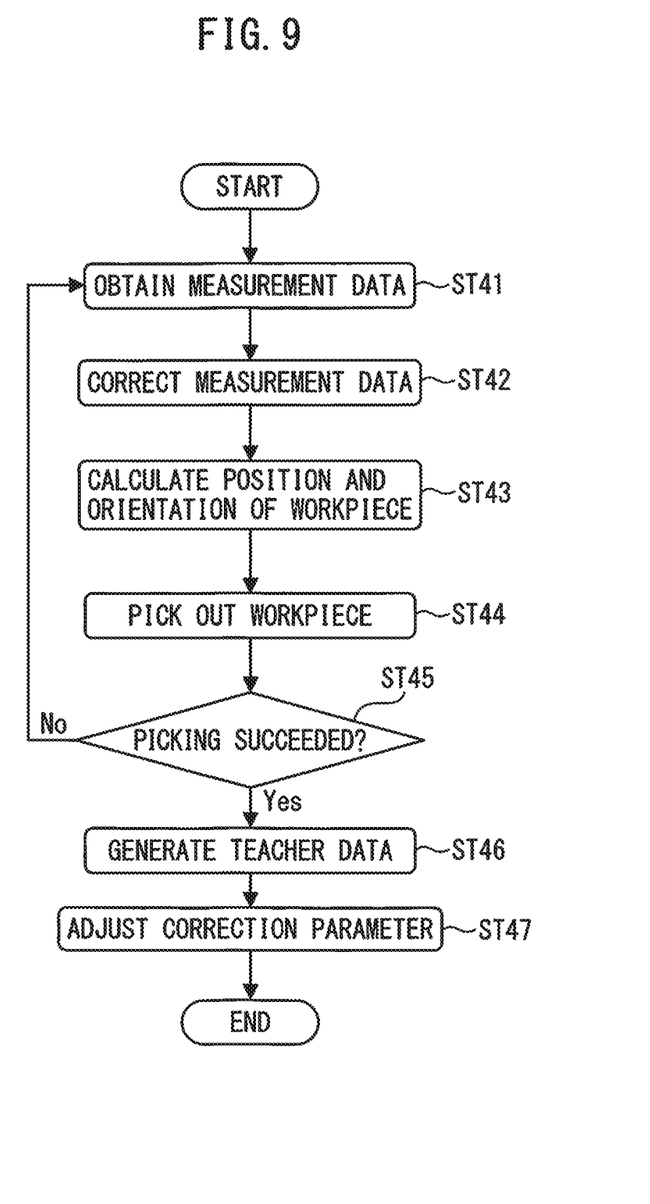
FIG. 9 is a flowchart for explaining an exemplary process for updating a learning model while performing a picking operation.

FIG. 9 is a flowchart for explaining an exemplary process for updating the learning model while performing the picking operation. As illustrated in FIG. 9, when the exemplary process including learning in the picking stage is started, measurement data is obtained in step ST41, and the process proceeds to step ST42 to correct measurement data. In correcting the measurement data in step ST42, for example, when the process is performed for the first time, the adjusted parameter is not retained, therefore, the measurement data is corrected by performing the process in the learning stage in advance or by using a preset initial parameter. It is to be noted that when using the initial parameter, the process in the learning stage need not be performed in advance.

Next, the process proceeds to step ST43 to calculate the position and the orientation of the workpiece, the process then proceeds to step ST44 to pick out the workpiece, and the process proceeds to step ST45. In step ST45, it is determined if picking out the workpiece has resulted in success or failure; when it is determined that picking out the workpiece has not resulted in success (failed), the process returns to step ST41 to obtain measurement data of the work area again, and the same process is repeated.

On the other hand, when it is determined that picking out the workpiece has resulted in success in step ST45, the process proceeds to step ST46 to generate teacher data for learning. In other words, with respect to the workpiece for which picking has resulted in success, teacher data is generated from the position and the orientation of the workpiece and the model data (CAD data) of the workpiece. Then, the process proceeds to step ST47 to adjust (update) the correction parameter, and the process is completed. It is to be noted that the aforementioned processes in steps ST41 to ST47 are performed for the operation of picking out each workpiece. Thus, it is possible to adjust the parameter for correcting the measurement data while actually performing the operation of picking out the workpiece.

As described above, the robot system, the measurement data processing device, and the measurement data processing method of the present embodiment may improve accuracy in picking out the workpiece by correcting the measurement data itself.

The robot system, the measurement data processing device, and the measurement data processing method according to the present invention may provide an advantageous effect of improving accuracy in picking out the workpiece by correcting the measurement data itself.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A robot system comprising:
    a robot including a hand configured to hold a workpiece;
    a sensor configured to measure a work area in which the workpiece exists to obtain a three-dimensional shape in the work area as measurement data;
    a measurement data processing device including a model data storage unit configured to store a three-dimensional shape of the workpiece as model data, a measurement data correction unit configured to correct the measurement data by means of machine learning, a position and orientation calculation unit configured to collate the measurement data with the model data to calculate a position and an orientation of the workpiece in the work area; and
    a robot control unit configured to control the robot based on an output from the position and orientation calculation unit, wherein
    the measurement data correction unit
        in a learning stage, creates teacher data by arranging the model data in the position and the orientation calculated by the position and orientation calculation unit and adjusts a parameter for correcting the measurement data based on the measurement data and the teacher data, and
        in a picking stage, outputs corrected measurement data obtained by correcting the measurement data using the adjusted parameter.

2. The robot system according to claim 1, wherein the measurement data processing device further comprising:
    a handshape storage unit configured to store shape data of the hand; and
    a collision determination unit configured to determine whether a collision will occur at a position and an orientation for holding the workpiece based on the shape data of the hand and the corrected measurement data.

3. The robot system according to claim 1, wherein
    the measurement data correction unit comprises an input acceptance unit configured to input whether to use an output result from the position and orientation calculation unit as the teacher data or not, and
    in the learning stage, the parameter for correcting the measurement data is adjusted using the teacher data given by the input acceptance unit.

4. The robot system according to claim 1, wherein the measurement data processing device further comprising:
    a holding determination unit configured to determine whether holding the workpiece has resulted in success or failure, wherein
    in the learning stage, the measurement data processing device inputs the teacher data created by arranging the model data in the position and the orientation calculated when holding has resulted in success into the measurement data correction unit, and adjusts the parameter for correcting the measurement data.

5. The robot system according to claim 1, wherein
    the workpiece includes a plurality of workpieces randomly loaded in the work area, and the sensor includes a visual sensor that is fixed at a position from which the work area are captured or mounted on a tip of the robot.

6. The robot system according to claim 1, wherein the measurement data processing device is built into a robot control apparatus that includes the robot control unit.

7. A measurement data processing device comprising:
a model data storage unit configured to store a three-dimensional shape of a workpiece as model data;
a measurement data correction unit configured to correct measurement data obtained by measuring a three-dimensional shape in a work area in which the workpiece exists by means of machine learning; and
a position and orientation calculation unit configured to collate the measurement data with the model data to calculate a position and an orientation of the workpiece in the work area, wherein
the measurement data correction unit
in a learning stage, creates teacher data by arranging the model data in the position and the orientation calculated by the position and orientation calculation unit and adjusts a parameter for correcting the measurement data based on the measurement data and the teacher data, and
in a picking stage, outputs corrected measurement data obtained by correcting the measurement data using the adjusted parameter.

8. The measurement data processing device according to claim 7, further comprising:
a handshape storage unit configured to store shape data of a hand of a robot which holds the workpiece; and
a collision determination unit configured to determine whether a collision will occur at a position and an orientation for holding the workpiece based on the shape data of the hand and the corrected measurement data.

9. The measurement data processing device according to claim 7, wherein
the measurement data correction unit comprises an input acceptance unit configured to input whether to use an output result from the position and orientation calculation unit as the teacher data or not, and
in the learning stage, the parameter for correcting the measurement data is adjusted using the teacher data given by the input acceptance unit.

10. The measurement data processing device according to claim 7, further comprising:
a holding determination unit configured to determine whether holding the workpiece has resulted in success or failure, wherein
in a learning stage, the measurement data processing device inputs the teacher data created by arranging the model data in the position and the orientation calculated when holding has resulted in success into the measurement data correction unit, and adjusts the parameter for correcting the measurement data.

11. The measurement data processing device according to claim 7, wherein the measurement data correction unit is configured using a multi-layer neural network.

12. The measurement data processing device according to claim 7, wherein the measurement data correction unit is capable of connecting with a measurement data correction unit in at least one other measurement data processing device, and mutually exchange or share the parameter adjusted by the measurement data correction unit with the measurement data correction unit in the at least one other measurement data processing device.

13. A measurement data processing method comprising:
storing a three-dimensional shape of a workpiece as model data;
correcting measurement data obtained by measuring a three-dimensional shape in a work area in which the workpiece exists by means of machine learning; and
collating the measurement data with the model data to calculate a position and an orientation of the workpiece in the work area, wherein
in a learning stage, teacher data is created by arranging the model data in the calculated position and orientation of the workpiece in the work area and a parameter for correcting the measurement data is adjusted based on the measurement data and the teacher data, and
in a picking stage, corrected measurement data obtained by correcting the measurement data using the adjusted parameter are output.

14. The measurement data processing method according to claim 13, wherein
input is made about whether to use the calculated position and orientation as the teacher data or not, and
in the learning stage, the parameter for correcting the measurement data is adjusted based on the teacher data input for use as the teacher data.

15. The measurement data processing method according to claim 13, further comprising:
determining whether holding the workpiece has resulted in success or failure; and
in the learning stage, based on the teacher data created by arranging the model data in the position and the orientation calculated when holding has resulted in success, adjusting the parameter for correcting the measurement data.

* * * * *